United States Patent [19]

Dolinar et al.

[11] 4,160,282
[45] Jul. 3, 1979

[54] OVERCURRENT PROTECTION APPARATUS

[75] Inventors: Kevin D. Dolinar, Canonsburg; John F. Burr, Pittsburgh, both of Pa.

[73] Assignee: Consolidation Coal Company, Pittsburgh, Pa.

[21] Appl. No.: 838,735

[22] Filed: Oct. 3, 1977

[51] Int. Cl.² .......................................... H02H 7/085
[52] U.S. Cl. ........................................ 361/31; 361/79; 361/93; 361/87; 324/158 T
[58] Field of Search .................. 361/87, 93, 98, 44, 361/45, 47, 48–50, 31, 86, 79; 328/146, 147, 150; 307/360, 351, 354; 324/158 T

[56] References Cited

U.S. PATENT DOCUMENTS

| 3,332,015 | 7/1967 | Barber | 324/158 T |
|---|---|---|---|
| 3,492,589 | 1/1970 | Rotier | 328/146 |
| 3,720,131 | 3/1973 | Frohock, Jr. et al. | 328/146 X |
| 3,733,538 | 5/1973 | Kernick et al. | 361/93 X |
| 3,742,303 | 6/1973 | Dageford | 361/87 X |
| 3,872,354 | 3/1975 | Nestor et al. | 361/45 |
| 3,953,767 | 4/1976 | Ahmed | 361/44 |

Primary Examiner—Patrick R. Salce
Attorney, Agent, or Firm—William A. Mikesell, Jr.; Stanley J. Price, Jr.; John M. Adams

[57] ABSTRACT

A trolley wire for conveying direct current power to an electrically powered vehicle in an underground mine is connected in series with a shunt to a power source. The current drawn by the trolley wire passes through a circuit breaker and the shunt. The shunt generates a voltage input signal proportional to the current drawn by the trolley wire. A solid state comparator device receives the input signal and compares it to a reference signal having a magnitude representing the maximum level of current permitted to flow through the conductor. If the reference signal exceeds the input signal, the comparator device supplies an output signal that oscillates between a positive and a negative voltage to a trip circuit. The output signal actuates the operating coil of the circuit breaker so that the circuit breaker contacts remain closed to permit current to flow through the shunt to the trolley wire. Upon occurrence of an overcurrent, the input signal exceeds the reference signal and the comparator device responds by terminating the oscillating output signal to the trip circuit. Termination of the output signal deenergizes the circuit breaker operating coil. The circuit breaker contacts are then opened and current flow through the circuit breaker is terminated.

12 Claims, 4 Drawing Figures

OVERCURRENT PROTECTION APPARATUS

BACKGROUND OF THE INVENTION

1. Field of the Invention

This invention relates to electrical apparatus for detecting an overcurrent flowing to a conductor and for protecting the conductor from the overcurrent, and more particularly to a solid state overcurrent relay for monitoring the current flowing to a trolley wire in an underground mine and opening the circuit to the trolley wire upon the occurrence of an overcurrent to prevent the trolley wire from drawing the overcurrent.

2. Description of the Prior Art

In the operation of electrically powered vehicles, such as portal buses, locomotives, haulage vehicles and the like, propelled on tracks in an underground mine direct current power is supplied to the vehicle from an overhead trolley wire suspended from the mine roof. Direct current is conveyed through the trolley wire from a remote source. The supply of direct current to the trolley wire in an underground mine presents a continual threat of fire in the mine caused by an overcurrent flowing through the trolley wire due to a fault. The overcurrent is capable of igniting coal and other combustible materials present within the mine.

It is the conventional practice to protect trolley wires and other conductors in an underground mine from the dangerous effects of an overcurrent with standard circuit breakers. Each standard circuit breaker has an electromechanical overcurrent relay connected so that rectified current from an A.C. power source flows through the normally closed contacts and the overcurrent relay to the trolley wire and the load. The circuit breaker operating coil is normally maintained energized, and therefore the circuit breaker contacts are normally closed permitting current to flow from the power source to the load as above described. In this event a current greater than the rated current flows through the overcurrent relay, the overcurrent relay removes power from the circuit breaker operating coil. The circuit breaker contacts are then opened and current flow through the circuit breaker is terminated.

The major disadvantage of the above overcurrent protection device is the inability to test the device without drawing an overcurrent through the circuit breaker. High energy testing of this type can be hazardous to the operating personnel. Furthermore, should the overcurrent relay be ineffective due to a malfunction of one of its components, there is no automatic means to indicate the failure of the relay. Consequently, the trolley wire may continue to draw an overcurrent until the circuit breaker is manually opened or the trolley wire becomes overheated, burns, and breaks with potentially disastrous effects.

It has been proposed by other prior art systems to connect a shunt in the circuit so that current from the power source flows through the circuit breaker contacts, the shunt, the trolley and then to the load. The shunt generates a voltage signal proportional to the current drawn by the trolley wire. A solid state overcurrent relay receives an input signal from the shunt and compares it to a reference signal having a magnitude representing the maximum level of current permitted to flow through the conductor. If the reference signal exceeds the input signal, the solid state overcurrent relay permits the circuit breaker operating coil to remain energized. Therefore current is permitted to flow through the circuit breaker contacts to the load as outlined above. Upon the occurrence of an overcurrent the input signal exceeds the reference signal, and the solid state overcurrent relay deenergizes the circuit breaker operating coil. The circuit breaker contacts are then opened and current flow through the circuit breaker is terminated. Solid state relays of this type have achieved reliability by either using quality control techniques or redundant components and circuits. However, the use of quality control techniques cannot insure continued safe operation in the event of a single component failure. Failure analysis of this type of equipment has shown that single component failures are most likely to occur when (1) integrated circuits, semiconductors, capacitors, transformers, inductors and surge suppression devices fail to open circuit or short circuit and (2) resistors, lamps and relay coils also fail to open circuit. Because of the critical nature of overcurrent protection apparatus and since the units are not installed at a normally attended location, it has been determined that the use of redundant components or circuits cannot provide adequate protection in the event of one of the above single component failures.

There is need for apparatus to protect underground trolley wires and other conductors in a mine in which the apparatus is capable of being tested without drawing an overcurrent through the apparatus. There is also need that this apparatus be designed so that in the event of any of the above single component failures it will either trip the circuit breaker immediately or be able to trip the circuit breaker if an overcurrent signal is received from the shunt. With this arrangement the use of redundant components or circuitry to protect against single component failures can be avoided.

SUMMARY OF THE INVENTION

In accordance with the present invention there is provided apparatus for detecting an overcurrent flowing through a conductor, such as a trolley wire in an underground mine, and protecting the conductor from the overcurrent in which a circuit breaker and a shunt are connected in series with the conductor. The current flowing through the conductor passes through the shunt, and the shunt is operable to generate an input signal proportional to the current flowing through the conductor. A reference point generator provides a reference signal having a magnitude representing the maximum current level permitted to flow through the conductor. A comparator device is connected to the shunt circuit and the reference point generator and receives the input signal from the shunt and the reference signal from the reference point generator. The comparator device is operable to generate an output signal in response to the magnitude of the signals received from the shunt and the reference point generator. As long as the reference signal exceeds the magnitude of the input signal from the shunt, the comparator device generates an output signal to a trip circuit. The trip circuit includes a relay that is normally energized by the output signal from the comparator device to maintain current flow through the circuit breaker. When the input signal from the shunt exceeds the reference signal from the reference point generator, the output signal of the comparator device is terminated. Thus the relay is deenergized, and the circuit breaker is opened to terminate the flow of current through the circuit breaker and the conductor.

The comparator device includes a positive comparator operable to determine if a positive input from the shunt exceeds the reference signal and similarly a negative comparator is provided to determine if a negative input from the shunt exceeds the reference signal. An oscillator is connected to both the positive and negative comparators and is energized by a power supply to actuate the comparator device to generate an oscillating output signal for actuation of the relay of the trip circuit. As long as the magnitude of the input from the shunt to the positive and negative comparators is less than the magnitude of the reference signal, the relay of the trip circuit remains energized. However, if an overcurrent condition occurs and the current flowing through the shunt exceeds the magnitude determined by the reference signal, the energizing signal to the relay of the trip circuit is terminated and the circuit is opened. Consequently the circuit breaker is opened, and the overcurrent does not flow through the conductor. In this manner the conductor is protected. The reference point generator is adjustable to a preselected current level which is determined by the current limits of the conductor.

Both the positive and negative comparators are connected to the trip circuit through a transistor and an A.C. transformer. Under normal operating conditions the oscillating signal transmitted by the comparator device switches the transistor between a conductive and a nonconductive state. Consequently, an oscillating signal is produced by the transistor and is transmitted to the A.C. transformer. The output of the transformer secondary winding is rectified and the relay of the trip circuit is energized. In the event an overcurrent flows through the shunt circuit, the transistor remains off and no current is delivered through the A.C. transformer. The relay of the trip circuit is deenergized, and the circuit to the conductor is opened. This prevents the overcurrent from flowing through the conductor. For a conductor such as a trolley wire that supplies D.C. current to electrically powered equipment in an underground mine, this arrangement protects the trolley wire and reduces the hazard of fire in the mine resulting from an overcurrent flowing through the trolley wire.

Upon the occurrence of an overcurrent, the input signal to the comparator device from the shunt exceeds the reference signal from the reference point generator. This produces an output signal of the comparator device that remains positive rather than an output signal that oscillates between a positive and a negative voltage. An operational amplifier transmits the output of the comparator device to the transistor of the trip circuit. If the output signal from the comparator device remains positive, then the operational amplifier becomes saturated with a negative voltage. A negative voltage to the transistor maintains the transistor in a nonconductive state so that no current is delivered to the relay. The relay deenergizes and the current through the conductor is interrupted when the circuit breaker opens.

When a trip signal is not received by the comparator device, the operational amplifier generates a signal which oscillates between positive and negative voltages. The transistor switches between a conductive and a nonconductive state to produce an oscillating signal which is transformed and rectified to energize the coil of the trip circuit relay and maintain a closed circuit through the circuit breaker to the conductor.

Not only is the circuit breaker opened when the current through the shunt is greater than the reference signal, but the circuit breaker is opened in the event one of the components of the overcurrent protection apparatus fails. Failure by opening or short circuiting of an integrated circuit, semiconductor, capacitor, transformer, inductor, or surge suppression device will open the circuit breaker. Also, an open circuit resulting in failure of a resistor, lamp, or relay coil will open the circuit breaker.

In addition, if one of the resistors of the reference point generator breaks, the signal that is transmitted directly from the reference point generator to the trip circuit relay is terminated, and the relay is deenergized to open the circuit breaker. Similarly, failure of one of the other components of the overcurrent protection apparatus, such as a broken shunt lead, deenergizes the trip circuit relay and prevents current from passing through the conductor. Thus, the apparatus of the present invention protects a conductor, such as a trolley wire, and prevents current flow through the conductor in the event the apparatus malfunctions.

Accordingly the principal object of the present invention is to provide an overcurrent protection apparatus for detecting the flow of an overcurrent through a conductor and to open a circuit breaker to the conductor protecting the conductor from an overcurrent.

A further object of the present invention is to provide an overcurrent protection apparatus having solid state components operable to control the operation of a relay so that when an overcurrent is detected by the apparatus the relay deenergizes a circuit breaker that controls flow of current to the conductor.

Another object of the present invention is to provide an overcurrent protection apparatus for use in underground mines for monitoring the level of current through a trolley wire to prevent the trolley wire from drawing an overcurrent by opening the circuit to the trolley wire and also without the use of redundant components or circuits to prevent any current flow to the conductor in the event the overcurrent protection apparatus fails.

Another object of the present invention is to provide for use in underground mining operation an overcurrent protection apparatus that can be safely tested and calibrated using a low energy test source.

These and other objects of the present invention will be more completely described and disclosed in the following specification, the accompanying drawings, and the appended claims.

DESCRIPTION OF THE PREFERRED EMBODIMENT

Figure 1:
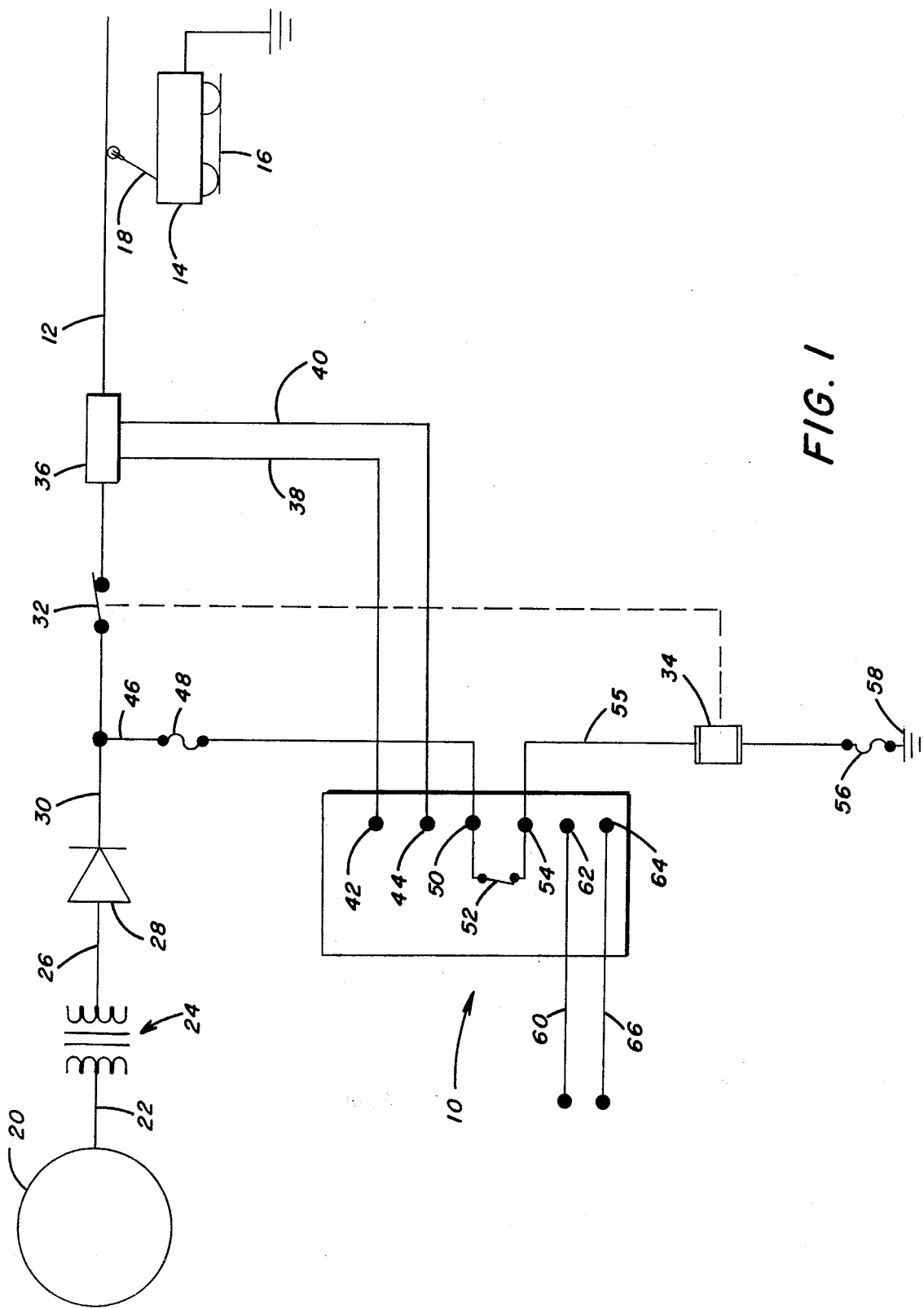
FIG. 1 is a schematic representation of a trolley system in an underground mine, illustrating a locomotive connected to receive current from the trolley wire and an overcurrent protection apparatus of the present invention connected to the trolley wire to protect the trolley wire against excessive currents by terminating current flow between the electrical source and the trolley wire.

Referring to the drawings, and particularly to FIG. 1, there is illustrated an overcurrent protection apparatus generally designated by the numeral 10 that is connected to a D.C. trolley wire 12 in an underground mine. The trolley wire supplies direct current to the drive motor of a trolley vehicle 14 that is propelled on tracks 16 within the haulageway of the underground mine. The trolley vehicle 14 is provided with a trolley pole 18 that is mounted on the body portion of the vehicle 14 and extends upwardly therefrom into electrical contact with the trolley wire 12. Generally the trolley wire 12 is positioned in the mine haulageway adjacent the mine roof, and direct current is supplied to the vehicle motor from the trolley wire 12 for propelling the vehicle 14, which may be a portal bus, locomotive, haulage vehicle, jeep and the like, on the tracks 16.

The trolley wire 12 receives power from a source 20 that generates alternating current which is transmitted through conductors 22 into the mine. The A.C. current flows through a step-down transformer 24 and conductor 26 to a rectifier 28. The rectifier 28 converts the alternating current to direct current. The direct current is transmitted through conductor 30 and a normally closed contact 32 of a circuit breaker 34 to a shunt 36 of the overcurrent protection apparatus 10 that is connected in series with the trolley wire 12. In response to the current flowing to the shunt 36, the shunt generates a signal through conductors 38 and 40, which are the shunt sensing leads, to input terminals 42 and 44 respectively of the overcurrent protection apparatus 10. Preferably, conductor 38 connects the positive terminal of shunt 36 with positive input terminal 42, and conductor 40 connects the negative terminal of shunt 36 with the negative input terminal 44. In operation in a mine the conductors 38 and 40 from the overcurrent protection device are tapped onto the positive and negative terminals, respectively, of the shunt 36. If the current drawn by the trolley wire 12, as sensed by the shunt 36, exceeds a preselected current permitted to flow through the trolley wire 12, the circuit to the trolley wire is opened, thereby protecting the trolley wire from the overcurrent condition.

Conventionally the trolley wire 12 is provided with overcurrent protection by the provision of the normally closed contacts 32 of circuit breaker 34. The rectified current from the rectifier 28 is directed from conductor 30 to conductor 46 and through the fuse 48 to an input terminal 50. The input terminal 50 is connected through a normally closed contact 52 to an output terminal 54. The output terminal, in turn, is connected to the operating coil of circuit breaker 34 and through a fuse 56 to ground 58. Power is supplied to the overcurrent protection apparatus 10 through conductors 60 and 66 to terminals 62 and 64 from a standard 120 volt A.C. source. With this arrangement rectified current is directed through conductor 46 to the input terminal 50 and the normally closed contacts 52 and through output terminal 54 and the conductor 55 to the operating coil of circuit breaker 34. Current to the circuit breaker operating coil maintains the contacts 32 in a normally closed position, as illustrated in FIG. 1, so that current flows through the shunt 36 to the trolley wire 12.

Figure 2:
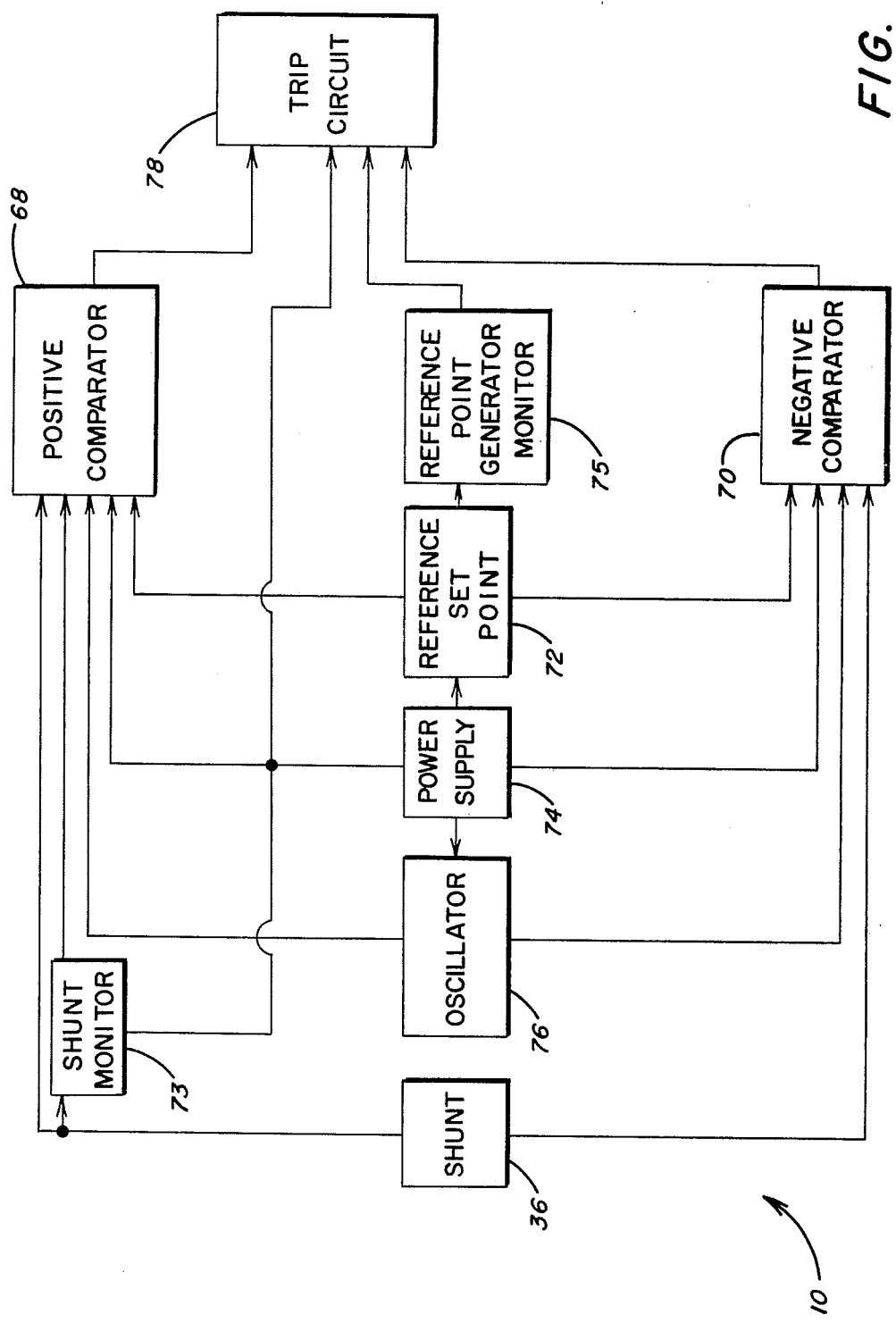
FIG. 2 is a block diagram, illustrating the electrical components of the overcurrent protection apparatus.

The components of the overcurrent protection apparatus 10 are diagrammatically illustrated in FIG. 2. The D.C. shunt 36 is connected in series with the load being drawn by the trolley wire 12. The input received by the shunt 36 is transmitted to a comparator device that includes a positive comparator 68 and a negative comparator 70. The positive and negative comparators 68 and 70 compare the input signal from the shunt with a preselected reference signal generated by a reference point generator 72. The reference signal received by the positive and negative comparators corresponds to a maximum current permitted to flow through the trolley wire 12. The reference point generator 72 is powered by a power supply 74 which also is operable to actuate the positive comparator 68, the negative comparator 70, a shunt monitor 73, an oscillator 76 and a trip circuit 78.

In the preferred practice of the present invention input signals from the shunt 36 to the comparators 68 and 70 are positive. However, in the event that the positive terminal 42 should be inadvertently connected to the negative terminal of the shunt 36 and the negative terminal 44, to the positive terminal of the shunt 36, then input from the shunt 36 is negative. Negative input from the shunt 36 will also be received by the comparators 68 and 70 for current flowing through the trolley wire 12 toward the shunt 36. Therefore, positive and negative comparators 68 and 70 are provided to compare both positive and negative inputs from the shunt with a preselected reference signal.

The oscillator 76 provides a signal that oscillates between zero and a negative voltage for the positive comparator 68 and a signal that oscillates between zero and a positive voltage for the negative comparator 70. Under normal operating conditions when the current to the trolley wire 12 does not exceed the maximum permissible current, the comparators generate an output signal to the trip circuit 78 which energizes the operating coil of circuit breaker 34, illustrated in FIG. 1. Current to the circuit breaker operating coil maintains the contacts 32 closed so that current flows to the trolley wire 12.

In the event of an overcurrent condition, the output of either of the comparators 68 and 70 to the trip circuit 78 is terminated. Terminating the output from either comparator to the trip circuit 78 deenergizes a relay 33, illustrated in FIG. 4, of the trip circuit. Deenergizing the relay 33 opens the contacts 52 and deenergizes the operating coil of circuit breaker 34 so that the contacts 32 open and current to the trolley wire 12 is interrupted. In this manner the trolley wire 12 is protected from the adverse effects of an overcurrent condition. Furthermore, as will be explained in greater detail, if one of the leads of the shunt 36 breaks or if one of the other components critical to the operation of the apparatus 10 malfunctions, the operating coil of circuit breaker 34 is deenergized and the contacts 32 are opened so that no current flows to the trolley wire 12.

Figure 3:
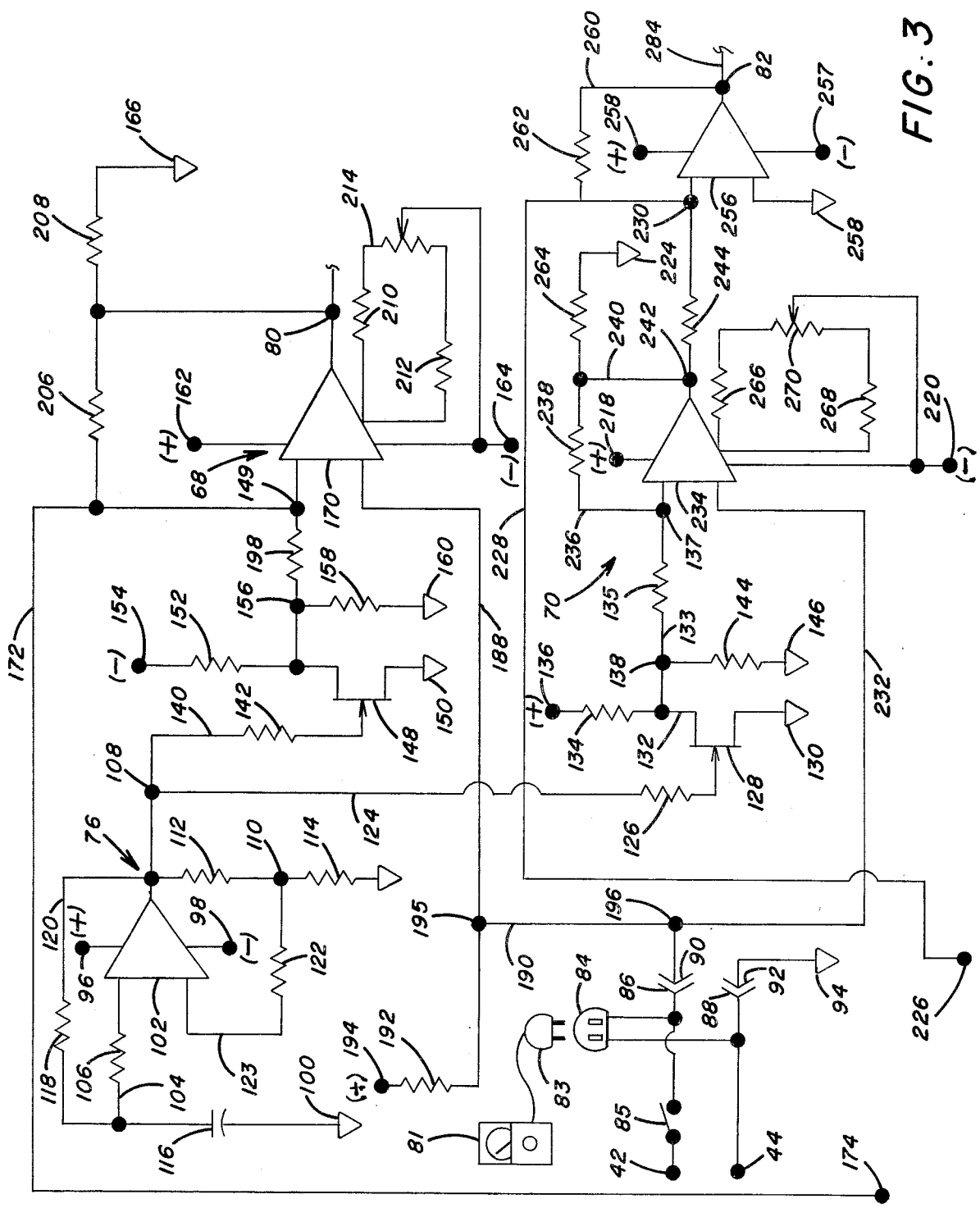
FIG. 3 is an electrical schematic, illustrating a comparator device for receiving signals from an oscillator and a shunt connected to the trolley wire and comparing the signal from a shunt with a preselected reference signal corresponding to a maximum current permitted to flow through the trolley wire.

Referring to FIG. 3 there is illustrated a portion of the overcurrent protection apparatus 10 that includes the input terminals 42 and 44 that are connected to the shunt 36 (not shown in FIG. 3). Input signals are transmitted through the shunt 36 to the positive comparator 68 and the negative comparator 70. The comparators 68 and 70 are actuated by the oscillator 76 to generate an oscillating output signal at the terminals 80 and 82 leading to the trip circuit 78. The oscillating signal to the trip circuit 78 is rectified for energizing the relay 33 which, in turn, energizes the operating coil of circuit breaker 34 to close the circuit breaker contacts 32.

The overcurrent protection apparatus 10 not only protects the trolley wire from drawing excessively high current, but permits testing of the operability of the apparatus without drawing the rated current through the trolley wire 12. This is accomplished by disconnecting the leads 38 and 40 of shunt 36 from terminals 42 and 44 and connecting a millivolt source 81 by plug 83 to a receptacle 84 connected across the terminals 42 and 44, as illustrated in FIG. 3. The mullivolt source 81 generates a signal that serves as input to the comparator device and simulates a voltage drop across the shunt 36. Accordingly, by setting the millivolt source 81 at the voltage corresponding to a trip current or overcurrent, the performance of the components of the overcurrent apparatus can be tested.

The millivolt source 81 includes plug 83 which is connected to receptacle 84 for testing purposes. Receptacle 84 is connected to the positive and negative comparators through terminals 86 and 88. Terminals 86 and 88 are connected to terminals 90 and 92, and terminal 92 is connected to the electrical common of the system at terminal 94. Reference will be made throughout to electrical commons which designate the points of connection of the various conductors to the electrical common of the apparatus 10. In operation the low energy millivolt source 81 is adjusted to transmit a voltage signal corresponding to a preselected trip current, as determined by the magnitude of the reference signal. If the components of the system are operable, the oscillating output of the comparators 68 and 70 to the trip circuit 78 is terminated and subsequently the relay coil 33 is deenergized opening contacts 52, deenergizing the operating coil of circuit breaker 34, and opening contacts 32 to thereby prevent current flow through the trolley wire 12. In this manner the apparatus 10 is tested without having to draw a trip current through the trolley wire 12 and the apparatus 10.

As illustrated in FIG. 3, the oscillator generally designated by the numeral 76 is connected at terminals 96, 98 and 100 to the positive, negative and common voltages of the apparatus 10 respectively. Power is supplied through the terminals 96 and 98 to an operational amplifier 102 that also receives input through conductor 104 and resistor 106 and through conductor 123 and resistor 122. The operational amplifier 102 provides an output signal at terminal 108. If the amplifier 102 is saturated with a positive voltage then terminal 108 becomes positive, and terminal 110 will be a less positive voltage, as determined by resistors 112 and 114 that form a voltage divider.

A capacitor 116 is connected to the electrical common 100 and charges with a positive voltage through a resistor 118 that is connected by conductor 120 to the output of the amplifier 102. When the voltage of capacitor 116 exceeds the voltage at terminal 110, the operational amplifier 102 saturates with a negative voltage. Terminals 108 and 110 become negative; consequently, capacitor 116 charges with a negative voltage. When the voltage on the capacitor 116 is more negative than at terminal 110, the operational amplifier 102 saturates positive. With this arrangement, the operational amplifier 102 generates an oscillating signal between the positive and negative voltages at terminal 108.

The frequency of the oscillation of the signals from operational amplifier 102 is determined by the value of the capacitor 116 and the resistor 118. Resistor 106 and resistor 122 limit the current flowing to the amplifier 102. When the voltage at terminal 108 is positive, current flows through conductor 124 and resistor 126 to the gate of a field effect transistor 128. Current through resistor 126 actuates the transistor 128 to provide current through the source of the transistor to the electrical common 130. The drain of transistor 128 is connected through conductor 132 and resistor 134 to a positive voltage source at terminal 136. Conductor 132 is connected by conductor 133 and resistor 135 to terminal 137. When transistor 128 is actuated, the voltage at terminal 138 goes to zero. When terminal 108 has a positive voltage, no current flows from terminal 108 through conductor 140 and resistor 142 so that transistor 148 is nonconductive, and the voltage at terminal 156 is determined by a voltage divider formed by resistors 152 and 158. Resistor 158 is connected to electrical common 160.

On the other hand, when the voltage at terminal 108 is negative, current flows through resistor 142 to the gate of a field effect transistor 148 having a drain connected to the electrical common 150. The source of transistor 148 is connected through resistor 152 to terminal 154 which is connected to a negative voltage source. When current flows through resistor 142, transistor 148 becomes conductive and transistor 128 becomes nonconductive. Accordingly, the voltage at terminal 156 goes to zero; while, the voltage at terminal 138 is determined by the voltage divider formed by resistors 134 and 144. Resistor 144 is connected to the electrical common 146.

The positive comparator 68 is operable to determine if a positive input signal from the shunt 36 with respect to the electrical common exceeds the magnitude of the reference signal from the reference point generator 72. Under normal operating conditions when an overcurrent condition does not exist, the output signal of the positive comparator at terminal 80 oscillates between a positive and a negative voltage. Consequently, the relay 33 remains energized and the contacts 52 remain closed. As a result current continues to flow through the coil of circuit breaker 34 to maintain the contacts 32 in a closed position. With the contacts 32 closed, current flows through the trolley wire 12 to the electrical load. However, if the current through the shunt 36 exceeds the reference signal, then the voltage at terminal 80 oscillates between two positive values with the resultant effect that the relay 33 is deenergized and the circuit to the trolley wire 12 is opened so that the trolley wire does not draw an overcurrent.

Figure 4:
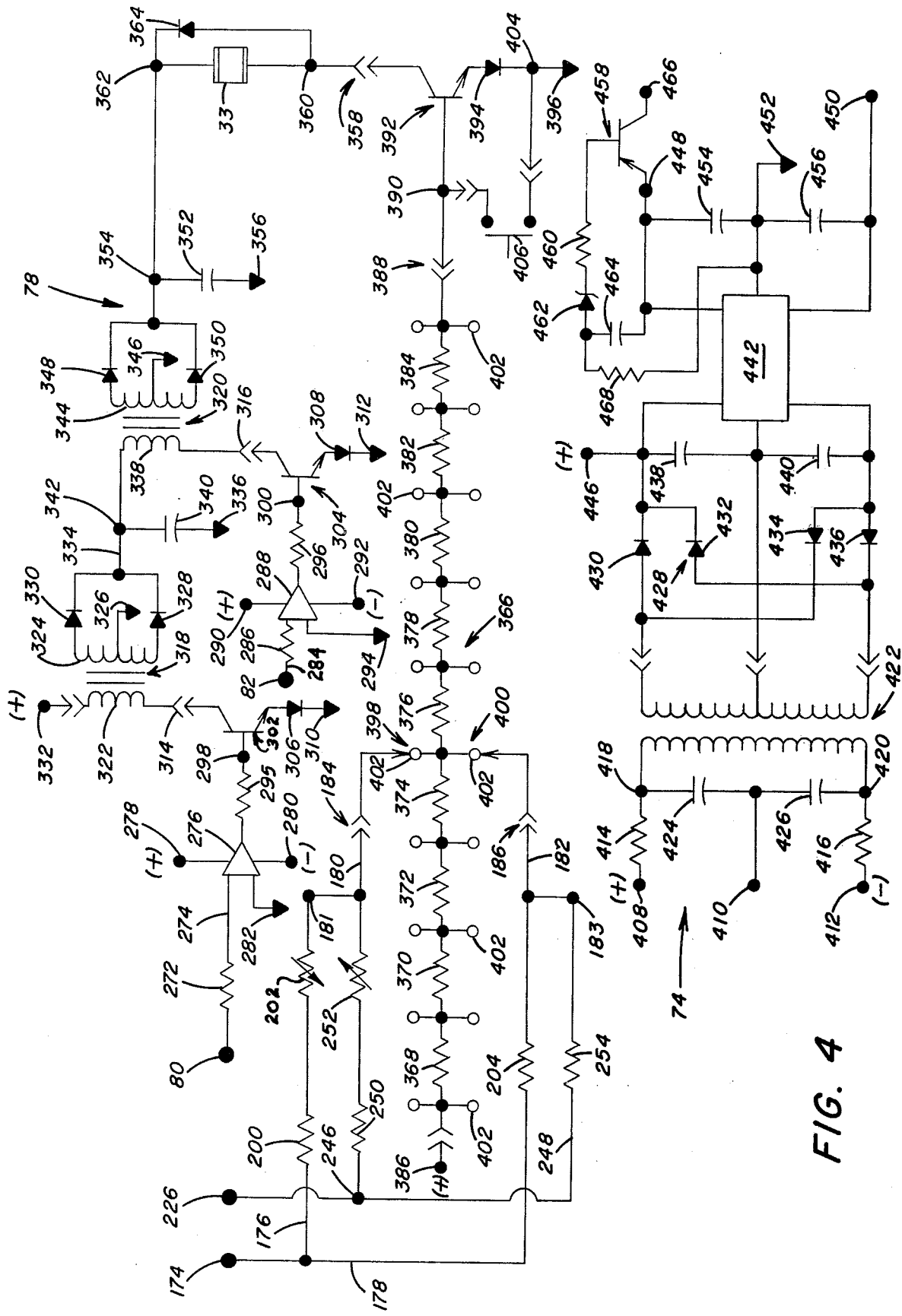
FIG. 4 is an electrical schematic, illustrating a reference point generator for generating the reference signal received by the comparator device and a trip circuit which includes a relay that is normally energized by output from the comparator device.

As illustrated in FIG. 3, terminals 162 and 164 are connected to the positive and negative voltages of the system, and terminal 166 is an electrical common. An operational amplifier 170 of the positive comparator receives reference signals through conductor 172 having a terminal 174 connected to conductors 176 and 178 (FIG. 4) that are connected to leads 180 and 182. The leads 180 and 182 are inserted in terminals 184 and 186 respectively of the reference point generator 72, as illustrated in FIG. 4. Conductor 176 is provided with a resistor 200 and potentiometer 202 and conductor 178 includes resistor 204. The amplifier 170 receives input signals from the shunt through conductors 188 and 190. Conductor 188 is also connected through resistor 192 to a positive voltage of the system at terminal 194.

The system is operable so that the voltage at terminal 149 is approximately the same as the voltage from the shunt at terminal 196, illustrated in FIG. 3. If the voltage at terminal 156 is zero, and the input from the shunt is zero, no current flows through resistor 198 to the amplifier 170. Because the voltage at terminals 181 and 183 from the reference point generator 72 is always positive, current flows to the operational amplifier 170 through resistor 200 and potentiometer 202 and resistor 204, illustrated in FIG. 4, connected to conductor 172 at terminal 174 in FIG. 3. Consequently the output signal from amplifier 170 is a negative voltage at output terminal 80.

When the voltage at terminal 156 becomes negative, and the input from the shunt is zero, the current flowing from amplifier 170 exceeds the current to the amplifier 170 through the resistor 200 and potentiometer 202 of conductor 176 and resistor 204 of conductor 178 which are connected to the leads of the reference point generator 72, as illustrated in FIG. 4. Consequently, terminal 80 becomes positive. With this arrangement when the input from the shunt is zero or a negative value, the output of the amplifier at terminal 80 oscillates between a negative and a positive voltage. On the other hand, when the input from the shunt is positive and the voltage at terminal 156 is negative more current flows from the amplifier 170 than flows to the amplifier 170 from the reference point generator 72. Then the amplifier output at terminal 80 is positive.

Further, when the voltage at terminal 156 is zero, and the input from the shunt is positive, current flows from the amplifier through resistor 198. As the input from the shunt increases to the trip setting, more current flows from the amplifier than is supplied to it from the reference point generator 72 so that the amplifier output at terminal 80 is again positive. Thus when the input from the shunt is a positive value greater than the indicated reference, the current drawn away from the amplifier 170 exceeds the input current pushed into it from the reference point generator 72, and the amplifier output at terminal 80 oscillates between two positive values. This represents an overcurrent condition when the current flowing through the shunt exceeds the reference current from the reference point generator 72.

In accordance with the operation of the amplifier 170, a feedback resistor 206 is provided across the input and output of the amplifier to limit the gain of the amplifier. Resistor 208 positioned in the circuit between the output terminal 80 and electrical common 166 provides a load for amplifier 170. Resistors 210 and 212 and potentiometer 214 provide offset adjustment for the amplifier 170.

The shunt monitoring circuit 73 is connected between the shunt 36 and the positive comparator 68. In normal operation of the shunt monitoring circuit 73, current is conducted from terminal 194, the positive voltage of the system, through resistor 192 and shunt 36 to the electrical common 94. Terminal 195 will be the voltage of the shunt 36. If one of the shunt sensing leads 38 or 40 brakes or becomes disconnected, no current will flow through resistor 192 and the voltage at terminal 195 will increase to the positive voltage of the system. This will simulate a very large overcurrent. Consequently, the output of the positive comparator will remain positive and relay 33 will become deenergized. Switch 85 tests the operation of the shunt monitoring circuit 73 to monitor the continuity of the shunt 36 and the shunt sensing leads 38 and 40 by opening one of the shunt sensing leads. This will prevent current flow through resistor 192 causing the output of the positive comparator 68 to remain positive and relay 33 to become deenergized.

Also, as illustrated in FIG. 3, the negative comparator 70 is operable to determine if a negative input signal from the shunt 36 exceeds the magnitude of the reference signal from the reference point generator 72. A negative input signal from shunt 36 occurs in the event the conductors 38 and 40 are incorrectly connected to the terminals of the shunt 36. Nevertheless, the provision of the negative comparator 70 permits a comparison to be made of a negative input signal from the shunt with the reference signal. Thus, a negative input signal from the shunt 36 exceeding the reference signal will also result in opening the circuit to the trolley wire. Under normal operating conditions when an overcurrent condition does not exist, the output signal of the negative comparator at terminal 82 oscillates between a positive and negative voltage as does the positive comparator 68. The occurrence of an overcurrent condition where the input signal from the shunt exceeds the reference point generator signal results in a positive voltage at terminal 82. Consequently, the relay 33 is deenergized and the circuit to the trolley wire 12 is opened. In this manner the trolley wire is protected from the overcurrent condition.

In operation terminals 218 and 220 are connected to the positive and negative voltages of the system, and terminal 224 is an electrical common. Reference signals from the reference point generator 72 are transmitted from terminal 226 through conductor 228 to terminal 230. Terminal 138 is the output terminal from the oscillator 76 to the negative comparator 70. Conductor 232 is connected to terminal 196 and supplies input signals to the negative comparator from the shunt. A first operational amplifier 234 of the negative comparator receives input from terminals 137 and 196. Terminals 218 and 220 supply the positive and negative power to amplifier 234. The amplifier 234 is operable so that the voltage as terminal 137 is approximately the same as the voltage from the shunt at terminal 196.

If the voltage at terminal 138 is zero, a negative voltage at terminal 196 causes that voltage to appear at terminal 137. This generates current flow to the amplifier 234. Current also flows from terminal 137 through conductor 236 and resistor 238 to a conductor 240 and a terminal 242 at the output of amplifier 234. The voltage at terminal 242 is approximately equal to the ratio of the resistance of resistor 238 to the resistance of resistor 135 times the voltage at terminal 196, the input from the shunt.

When the voltage at terminal 138 from the oscillator is positive, the current through resistor 135 to the amplifier 234 is sufficiently large to saturate the amplifier with a negative voltage. Thus the output of amplifier 234 at terminal 242 oscillates between a small negative value, proportional to the voltage at terminal 196 and the negative voltage of the system. A large negative voltage at terminal 242 results in more current flowing from amplifier 256 through resistor 244 than flows to terminal 230 from conductor 228 and terminal 226 at the output from the reference point generator 72. As illustrated in FIG. 4, terminal 226 is connected to terminal 246 which is connected to conductor 248. Leads 180 and 182 are connected to the terminals of the reference point generator 72. Terminal 246 is connected to a resistor 250 and a potentiometer 252, and conductor 248 includes resistor 254.

A second operational amplifier 256 is connected to terminal 230 and generates an output signal at output terminal 82 of the negative comparator 70. If the input from shunt terminal 196 does not exceed the reference signal and the voltage at terminal 138 is zero, then the current flowing to the amplifier 256 through resistor 244 is a relatively small value, and more current flows to amplifier 256 from the reference point generator than flows to amplifier 256 through resistor 244. Consequently, the output of amplifier 256 is a negative voltage. In the above-described manner for normal operation of the negative comparator 70, i.e., when an overcurrent condition does not exist, amplifier 256 generates an output signal that oscillates between a positive and a negative value.

When the magnitude of the current through the shunt exceeds the magnitude of the reference signal, and the voltage at terminal 138 is zero, the current through resistor 244 is greater than the current supplied from the reference point generator through conductor 228 to terminal 230. The output of amplifier 256 at terminal 82 then oscillates between two positive values. The amplifier 256 is connected to the electrical common 258, and a conductor 260 is connected across conductor 228 and output terminal 82 and includes a resistor 262 that limits the gain of amplifier 256. Resistor 264 provides a load for amplifier 234, and resistors 266, 268 and potentiometer 270 provide an off-set adjustment for amplifier 234.

With the above described arrangement the positive and negative comparators 68 and 70 generate at terminals 80 and 82 output signals, under normal operating conditions, which oscillate between positive and negative values to energize relay coil 33 of the trip circuit 78. As discussed above, upon the occurrence of a trip signal when the current through the shunt exceeds the reference signal, output from either terminal 80 or 82 ceases to oscillate between positive and negative values but remains positive and the operating coil 34 of the circuit breaker is deenergized by operation of the trip circuit 78. The elements of the trip circuit 78 are illustrated in FIGS. 3 and 4.

In FIG. 4, the trip circuit is connected to terminal 80 through resistor 272 and conductor 274 to an operational amplifier 276 that receives its input power through terminals 278 and 280. The amplifier is connected to an electrical common at terminal 282. Similarly, the trip circuit 78 includes conductor 284 connected to terminal 82 of the negative comparator. The signal from terminal 82 is transmitted through a resistor 286 to an operational amplifier 288 having terminals 290 and 292 connected to the power source of the system and terminal 294 connected to an electrical common. The amplifiers 276 and 288 transmit signals through resistors 295 and 296 to terminals 298 and 300 to transistors 302 and 304 respectively. The positive and negative oscillating signals are received by transistors 302 and 304 respectively, which include emitters connected through diodes 306 and 308 to electrical commons 310 and 312 and collectors connected through terminals 314 and 316 to A.C. transformers 318 and 320. The diodes 306 and 308 protect transistors 302 and 304 against large reverse voltages.

With the above arrangement amplifier 276 under normal conditions generates output signals which oscillate between the positive and negative voltages of the system. A positive signal generates current through resistor 295 to the base of transistor 302 and switches transistor 302 from a nonconductive state to a conductive state. In this manner the transistor is "turned on". When the output of amplifier 276 is negative, no current flows to the base of transistor. The transistor 302 remains nonconductive or is "turned off". With this arrangement a signal oscillating between positive and negative values to transistor 302 turns the transistor on and off to produce an oscillating signal.

The oscillating signal is transmitted to the primary winding 322 of the A.C. transformed 318. The signal is reflected on the secondary winding 324. Secondary winding 324 is connected to electrical common 326 and diodes 328 and 330 which rectify the output from secondary winding 324 from an oscillating signal to a constant value signal. The primary winding 322 is connected at terminal 332 to a positive voltage of a preselected magnitude, for example 24 volts. The rectified output is directed through conductor 334 to capacitor 340 and the primary winding 338 of A.C. transformer 320. Capacitor 340 filters the output and is also connected to electrical common 336. The windings of transformer 318 are selected so that the voltage at terminal 332 is equal to the voltage at terminal 342. When a trip signal is received the input to amplifier 276 remains positive; subsequently, amplifier 276 becomes saturated with negative voltage and the signal to transistor 302 remains negative. As a result transistor 302 remains nonconductive, and the voltage at terminal 342 is zero.

If the voltage at terminal 342 is positive, and the signal to transistor 304 oscillates between positive and negative values, then no trip signal has been received. When the output of amplifier 288 is a signal of a positive voltage, current flows through resistor 296 to the base of transistor 304 which becomes conductive and is "turned on". Accordingly, when the amplifier 288 becomes negative, no current flows through resistor 296 and transistor 304 is switched to a nonconductive state or is "turned on". As a result, an oscillating signal is received by the primary winding 338 of transformer 320 and is reflected on the secondary winding 344. Secondary winding 344 is connected to electrical common 346. Diodes 348 and 350 rectify the oscillating output of secondary winding 344 to a constant value signal. A capacitor 352 is connected to terminal 354 and is operable to filter the output and is connected to electrical common 356.

The windings of transformer 320 are selected so that the voltage at terminal 354 is equal to the voltage at terminal 342 under normal operating conditions, and the relay coil 33 is energized. However, if the output signal of amplifier 256 remains a positive value and does not oscillate between a positive and a negative value, an indication that the input from the shunt has exceeded the reference, the voltage at terminal 82 remains positive. Consequently, the amplifier 288 becomes saturated with a negative voltage, and no current flows through resistor 296. With no current flowing to transistor 304, the transistor 304 remains turned off. This produces zero voltage at terminal 354, and the relay coil 33 is deenergized. As stated above, when relay coil 33 is deenergized, contacts 32, as illustrated in FIG. 1, are opened, and overcurrent is prevented from flowing to the trolley wire 12 and the electrical load which receives current therefrom.

As stated hereinabove not only is the overcurrent protection apparatus 10 operable to detect overcurrent signals and prevent flow of the overcurrent signals to the trolley wire 12, but the apparatus 10 is also operable to prevent flow of current to the trolley wire 12 or to trip the circuit breaker in the event of any of the following single component failures: (1) the failure by either open or short circuiting of integrated circuits, semiconductors, capacitors, transformers, inductors and surge suppression devices, and (2) the failure by open circuiting of resistors, lamps and relay coils.

If, for example, resistor 142 in the oscillator circuit fails by open circuiting, then transistor 148 will remain nonconducting and terminal 156 will not oscillate but remain negative. This will cause the output of amplifier 170 at terminal 80 to remain positive and thus the relay 33 will be deenergized. This will deenergize the operating coil of circuit breaker 34 and open contacts 32, thus preventing current flow through the trolley wire 12.

The reference point generator 72 is connected to the comparator device at terminals 184 and 186 and to the trip circuit at a terminal 358. Terminal 358 is, in turn, connected to terminals 360 of relay coil 33. Relay coil 33 also includes a terminal 362, and a diode 364 is connected to terminals 360 and 362 across the relay coil 33.

A resistance divider network generally designated by the numeral 366 of the reference point generator 72 includes a plurality of resistors 368-384 connected at terminal 386 to the positive voltage source of the system and through connection 388 to a terminal 390 that is connected to the base of a transistor 392. The collector of transistor 392 is connected to terminal 358 and the emitter to a diode 394 that is connected to electrical common 396. Switches 398 and 400, such as thumbwheel switches, connected to terminals 184 and 186 provide selection of a preselected reference signal from the reference point generator 72. Switches 398 and 400 are each connected to a selected one of the taps 402 associated with each of the resistors 368-384.

Operation of the reference point generator 72 generates a positive signal to the reference point generator monitor 75, illustrated in FIG. 2. A positive signal to the reference point generator monitor 75 switches transistor 392 to a conductive state and current flows from the collector of transistor 392 to terminal 360 and the relay coil 33. Consequently, if a positive voltage exists at terminal 362 and transistor 392 is conductive, then relay coil 33 is energized. However, if one of the resistors 368-384 opens, the base current to transistor 392 is interrupted and transistor 392 switches to a nonconductive state. The relay coil 33 is deenergized and the circuit to the trolley wire is opened. In this manner failure of the reference point generator deenergizes the relay coil 33, whether or not an overcurrent condition exists. Thus the malfunction must be repaired before current flows to the trolley wire.

The operability of the transistor 392 is tested by connecting to terminals 390 and 404, a test switch 406 which is normally maintained open. Closing the test switch 406 shorts the base to the emitter of transistor 392 and switches the transistor 392 to a nonconductive state. If the transistor 392 is operable, no current flows to terminal 360 and the relay coil 33 is deenergized. Further, in accordance with the present invention, diode 364 protects the transistor 392 against a reverse voltage spike which relay coil 33 produces when deenergized. Also, diode 394 protects transistor 392 against large reverse voltages.

The power supply 74, illustrated in detail in FIG. 4, in the source of D.C. power for the overcurrent protection apparatus 10. Terminals 408, 410 and 412 are directed to a source of alternating current voltage, such as 120 volts A.C. and supply the current through resistors 414 and 416 to terminals 418 and 420 of the primary winding of a step down transformer 422. Capacitors 424 and 426 are provided across the connection of terminals 418 and 420. The secondary winding of transformer 422 is connected to a full wave bridge rectifier generally designated by the numeral 428 which includes diodes 430-436.

The bridge rectifier 428 transmits D.C. input through filtering capacitors 438 and 440 to a voltage regulator 442. Terminal 446 is the unregulated positive voltage of the system and is connected to terminal 332 of the trip circuit 78. The voltage regulator 442 provides a regulated positive D.C. output at terminal 448 and a regulated negative D.c. output at terminal 450 with respect to terminal 452, the electrical common. Capacitors 454 and 456 are filtering capacitors. Terminal 450 is connected by conductors (not shown) to terminals 98 and 154 of the oscillator 76, to terminal 164 of the positive comparator 68, to terminals 220 and 257 of negative comparator 70, and to terminals 280 and 292 of the trip circuit 78.

Terminal 448 is connected to the emitter of a transistor 458 having a base connected through a resistor 460 to a Zener diode 462. Zener diode 462 is connected by capacitor 464 to the output of voltage regulator 442. With this arrangement the transistor 458 becomes conductive after the output of voltage regulator 442 reaches the threshold value of the Zener diode 462 and after the delay provided by resistor 460 and capacitor 464. When transistor 458 switches to a conductive state, a regulated positive voltage appears at terminal 466. Terminal 466 is connected by conductors (not shown) to terminals 96 and 136 of the oscillator 76, to terminals 162 of the positive comparator, to terminals 218 and 258 of the negative comparator, to terminals 278 and 290 of the trip circuit, to terminal 386 of the reference point generator 72, and terminal 194 of the shunt monitor 73. Also, a resistor 468 is provided to discharge the capacitor 464.

According to the provisions of the Patent Statutes, we have explained the principle, preferred construction and mode of operation of our invention and have illustrated and described what we now consider to represent its best embodiments. However, it should be understood that, within the scope of the appended claims, the invention may be practiced otherwise than as specifically illustrated and described.

We claim:

1. Apparatus for detecting an overcurrent flowing through a conductor and protecting the conductor from the overcurrent comprising, a circuit breaker adapted to be connected in series with a direct current conductor, said circuit breaker being operable in a closed position to permit the flow of direct current through the conductor and in an open position to terminate the flow of direct current through the conductor, a shunt adapted to be connected in series with the conductor so that direct current flows through said shunt to the conductor, said shunt being operable to generate an input signal at a voltage proportional to the direct current flowing through the conductor, reference means for generating a reference signal at a voltage of a magnitude proportional to the maximum direct current permitted to flow through the conductor, a monitor circuit connected to said reference means and said circuit breaker for monitoring the operability of said reference means to generate a reference signal, said monitor circuit being responsive to said reference signal generated by said reference means to actuate said circuit breaker to close and thereby permit the flow of direct current through the conductor, said monitor circuit being operable upon failure of said reference means to generate a reference signal to open said circuit breaker and prevent flow of direct current through the conductor, comparator means connected to receive the input signal from said shunt and the reference signal from said reference means, said comparator means being operable to generate an output signal in response to the magnitude of the input signal and the reference signal from said shunt and said reference means respectively, a trip circuit connected to receive the output signal from said comparator means, said trip circuit including a relay, and said relay being normally energized by the output signal of said comparator means to normally maintain said circuit breaker in a closed position and permit direct current flow through said circuit breaker so that when the input signal from said shunt exceeds the reference signal from said reference means the output signal of said comparator means is terminated and said relay is deenergized to open said circuit breaker and terminate flow of direct current through said circuit breaker and the conductor.

2. Apparatus for detecting an overcurrent through a conductor and protecting the conductor from the overcurrent as set forth in claim 1 which includes, low energy testing means removably connected to said comparator means for transmitting a preselected millivolt test signal simulating a voltage drop across said shunt and corresponding to a preselected overcurrent to said comparator means, and said comparator means being responsive to said test signal from said testing means to terminate the output signal to said trip circuit and deenergize said relay and trip said circuit breaker to terminate current flow through the conductor so that the operability of the overcurrent apparatus is testable without having to draw an overcurrent through the apparatus and the conductor.

3. Apparatus for detecting an overcurrent through a conductor and protecting the conductor from the overcurrent as set forth in claim 1 in which, said monitor circuit includes a transistor connecting said reference means with said relay of said trip circuit, said transistor being operable upon the reception of said reference signal from said reference means to switch to a conductive state so that current flows to said relay and said relay is energized, said transistor being operable in the absence of said reference signal from said reference means to switch to a nonconductive state so that current does not flow to said relay and said relay is deenergized, and said reference means being operable in the event of a malfunction thereto to terminate said reference signal to said transistor and deenergize said relay.

4. Apparatus for detecting an overcurrent through a conductor and protecting the conductor from the overcurrent as set forth in claim 3 which includes, a test switch positioned between said reference means and said transistor, said test switch arranged to move between a first position permitting current flow from said reference means to said transistor and a second position preventing current flow from said reference means to said transistor, and said test switch being operable upon actuation to move from said first position to said second position and thereby test the operability of said transistor with said transistor remaining connected in said monitor circuit.

5. Apparatus for detecting an overcurrent through a conductor and protecting the conductor from the overcurrent as set forth in claim 1 in which said reference means includes, means for generating a reference signal, an output terminal, a resistance divider network positioned between said means for generating a reference signal and said output terminal for supplying a reference signal to said comparator means at a preselected voltage corresponding to the maximum current permitted to flow through the conductor, and switch means connecting said output terminal with said resistance divider network for selecting the voltage to be drawn by said resistance divider network and applied to said output terminal.

6. Apparatus for detecting an overcurrent through a conductor and protecting the conductor from the overcurrent as set forth in claim 1 which includes, oscillator means connected to said comparator means for generating an oscillating input signal to said comparator means, said comparator means being operable to compare said oscillating input signal with the direct current reference signal from said reference means, said comparator means being actuated by said oscillating input signal to transmit an output signal at a voltage oscillating between positive and negative values to said trip circuit and thereby actuate said trip circuit to maintain said relay in a normally energized condition when the magnitude of the input signal from said shunt is less than the magnitude of said reference signal, and means for supplying power at a preselected voltage to said comparator means, said reference means, and said oscillator means.

7. Apparatus for detecting an overcurrent through a conductor and protecting the conductor from the overcurrent as set forth in claim 1 which includes, said comparator means being operable when the magnitude of the input signal from said shunt exceeds the magnitude of said reference signal to transmit an output signal at a voltage between zero and a positive value to terminate current flow to said trip circuit and deenergize said relay.

8. Apparatus for detecting an overcurrent through a conductor and protecting the conductor from the overcurrent as set forth in claim 1 which includes, said comparator means being operable to compare said reference signal with a positive input signal and a negative input signal from said shunt as determined by the direction of the current through the conductor.

9. Apparatus for detecting an overcurrent through a conductor and protecting the conductor from the overcurrent as set forth in claim 1 in which said comparator means includes,
   a positive comparator and a negative comparator,
   said positive comparator being operable to receive an input signal of a positive voltage from said shunt and terminate the output signal to said trip circuit when the positive input signal exceeds the reference signal,
   said negative comparator being operable to receive an input signal of a negative voltage from said shunt and terminate the output signal to said trip circuit when the negative input signal exceeds the reference signal, and
   oscillator means for supplying said positive comparator with an input signal oscillating between zero and a negative voltage and said negative comparator with an input signal oscillating between zero and a positive voltage.

10. Apparatus for detecting an overcurrent through a conductor and protecting the conductor from the overcurrent as set forth in claim 9 which includes,
    said positive and negative comparators each having a plurality of transistors being operable under normal current conditions to switch between a conductive and a nonconductive state and generate an oscillating output signal to said trip circuit,
    said trip circuit having rectifier means for supplying current to said relay in response to the oscillating output signal from said positive and negative comparators to energize said relay, and
    said rectifier means being operable under overcurrent conditions to prevent flow of current to said relay in the absence of an oscillating output signal from one of said comparators to deenergize said relay.

11. Apparatus for detecting an overcurrent flowing through a conductor and protecting the conductor from the overcurrent as set forth in claim 1 which includes,
    shunt sensing leads connecting said shunt with said comparator means,
    a shunt monitoring means for continuously monitoring the continuity of said shunt and said shunt sensing leads, and
    said shunt monitoring means being operable upon a break in the shunt sensing leads to interrupt said shunt input signal to said comparator means and thereby open said circuit breaker and terminate current flow to the conductor.

12. Apparatus for detecting an overcurrent flowing through a conductor and protecting the conductor from the overcurrent as set forth in claim 11 which includes,
    a test switch connected to said shunt sensing leads between said shunt monitoring means and said shunt,
    said test switch arranged to move between a first position permitting current flow through said shunt sensing leads from said shunt monitoring means to said shunt and a second position preventing current flow through said shunt sensing leads from said shunt monitoring means to said shunt, and
    said test switch being operable upon actuation to move from said first position to said second position and thereby test the operability of said shunt monitoring means.

* * * * *

UNITED STATES PATENT OFFICE
CERTIFICATE OF CORRECTION

PATENT NO. : 4,160,282
DATED : July 3, 1979
INVENTOR(S) : Kevin D. Dolinar and John F. Burr It is certified that error appears in the above-identified patent and that said Letters Patent are hereby corrected as shown below:

Col. 7, line 11:   "mullivolt" should read --millivolt--

Col. 9, line 58:   "brakes" should read --breaks--

Col. 10, line 40:  "voltage as terminal" should read --voltage at terminal--

Col. 12, line 37:  "turned on" should read --"turned off"--

Col. 13, line 64:  "FIG. 4, in" should read --FIG. 4, is--

Col. 14, line 14:  "D.c." should read --D.C.--

Signed and Sealed this

Sixteenth Day of October 1979

[SEAL]

Attest:

RUTH C. MASON
Attesting Officer

LUTRELLE F. PARKER
Acting Commissioner of Patents and Trademarks